(No Model.) 2 Sheets—Sheet 1.

S. JOHNSON.
SEWER GATE.

No. 289,108. Patented Nov. 27, 1883.

Witnesses:
Geo. H. Strong

Inventor
Sam'l Johnson
By Dewey & Co.
Attorneys (No Model.) 2 Sheets—Sheet 2.

S. JOHNSON.
SEWER GATE.

No. 289,108. Patented Nov. 27, 1883.

Witnesses,
Geo. H. Strong.
J. H. Rouse.

Inventor
Sam'l Johnson
By Dewey & Co.
Attorneys

UNITED STATES PATENT OFFICE.

SAMUEL JOHNSON, OF SAN FRANCISCO, CALIFORNIA.

SEWER-GATE.

SPECIFICATION forming part of Letters Patent No. 289,108, dated November 27, 1883.

Application filed February 5, 1883. (No model.)

*To all whom it may concern:*

Be it known that I, SAMUEL JOHNSON, of the city and county of San Francisco, State of California, have invented an Improved Sewer-Gate; and I hereby declare the following to be a full, clear, and exact description thereof.

My invention relates to an automatic or self-acting sewer-gate; and it consists in certain details of construction and combinations of devices, as hereinafter fully described and claimed.

Figure 1:
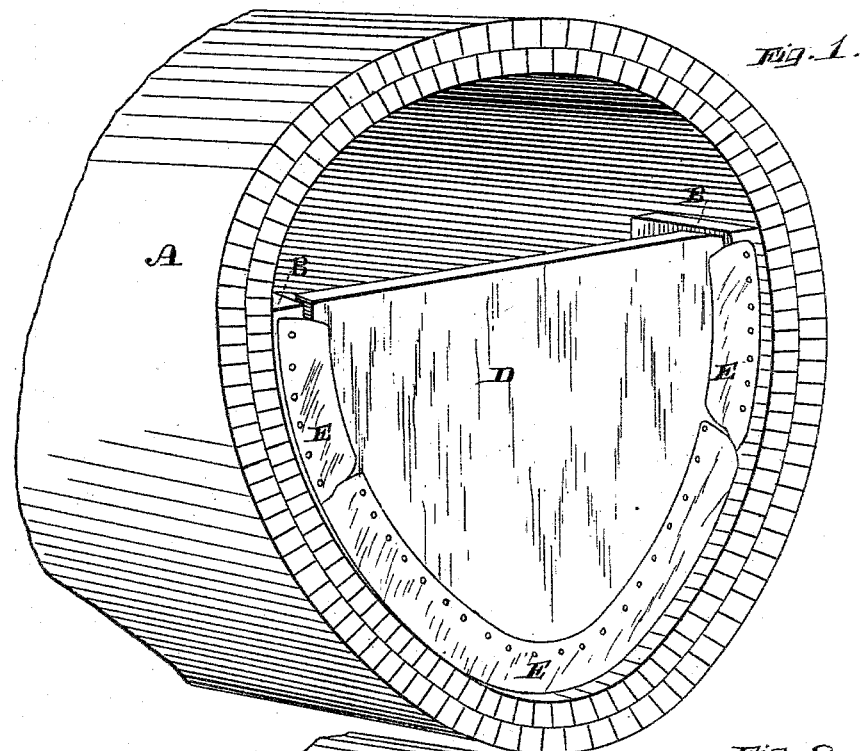
Figure 2:
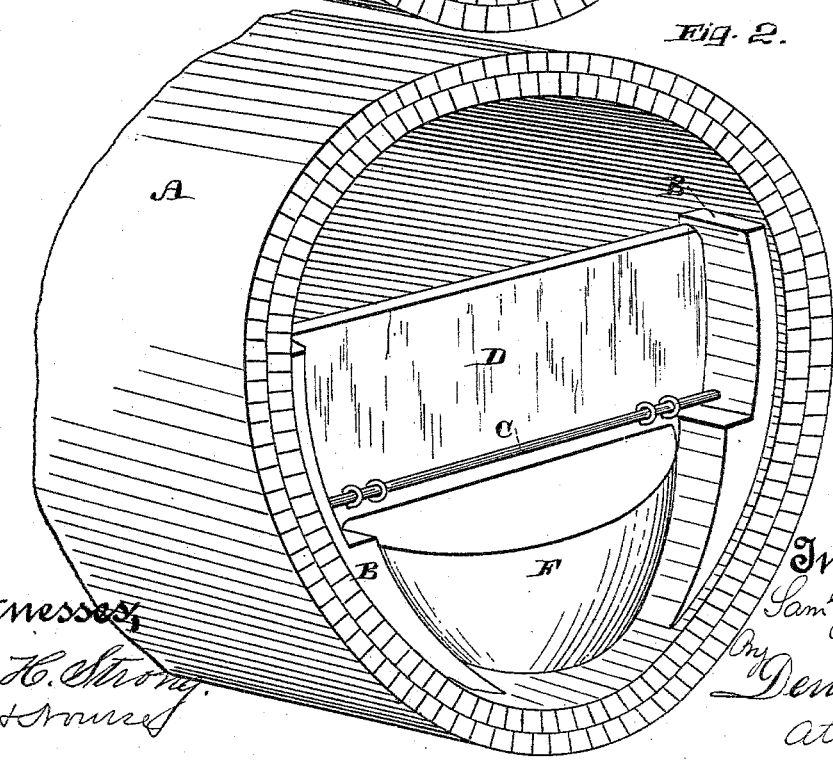
Figure 3:
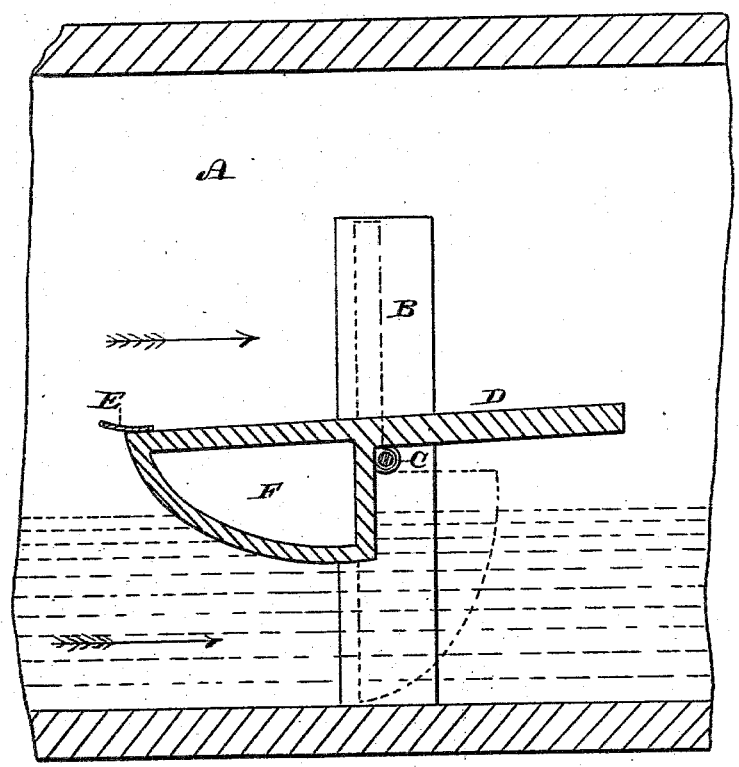

Referring to the accompanying drawings for a more complete explanation of my invention, Figure 1, Sheet 1, is a view of a section of a sewer with my gate, showing the front side. Fig. 2, Sheet 1, shows the rear or back side of the gate and the float. Fig. 3, Sheet 2, is a vertical section through the sewer and gate.

A is a section of a sewer, having within it a frame-work, B, which is fitted to its interior, and fixed therein so as to be tight and immovable. Across this frame-work a rod, C, extends, and a gate, D, is properly journaled so as to turn upon this rod. The gate may occupy one-half, two-thirds, or other proportion of the height of the sewer, and the rod or shaft crosses it at such a point that the greatest area of gate-surface is exposed above the shaft. The outer edges of the gate are provided with a flexible flap, E, of rubber or other suitable material, which, when the gate is closed, will be pressed against the frame by the water, and will thus make a tight joint. When left to itself, the gate will close against the frame, and the flow of water down the sewer will press it closely, so that none can pass until it has risen above the rod or shaft C to near the top of the gate, when the superior pressure upon this part, produced by the greater area, will tilt the gate and cause it to turn about its shaft and open. In order to prevent the rush of water from closing the gate again, I fix to or form upon the back or lower side a large float, F, which is preferably made hollow and light, and it is rounded and tapered toward the bottom, so that when the gate is first tilted and opened this float will cause it to rise and lie upon the surface of the passing current, which flows beneath the float, thus keeping the gate open until the water has nearly or quite all passed out, when the angle will be such that the water will again act upon the front of the gate to close it, and the operation will be repeated. The first movement in opening the gate swings the bottom backward and upward so far as to allow the water to act upon the float and buoy it up until the edge of the gate is nearly or quite above the current, and will not be acted upon by it so as to tend to close it, and it remains in this relative position, owing to the buoyancy of the float, until nearly all the water has escaped before it will descend sufficiently to carry the float beyond the influence of the current and again allow the gate to close.

Having thus described my invention, what I claim as new, and desire to secure by Letters Patent, is—

In a sewer, an automatic gate suspended upon a horizontal shaft or axis, so that a greater area of surface is presented above the axis, said gate having the float F upon its lower and outer side, substantially as herein described.

In witness whereof I hereunto set my hand.

SAMUEL JOHNSON.

Witnesses:
   S. H. NOURSE,
   G. W. EMERSON.